No. 727,851. PATENTED MAY 12, 1903.
W. SCHULTZ.
CORN HUSKING MACHINE.
APPLICATION FILED JULY 5, 1901.
NO MODEL. 5 SHEETS—SHEET 2.
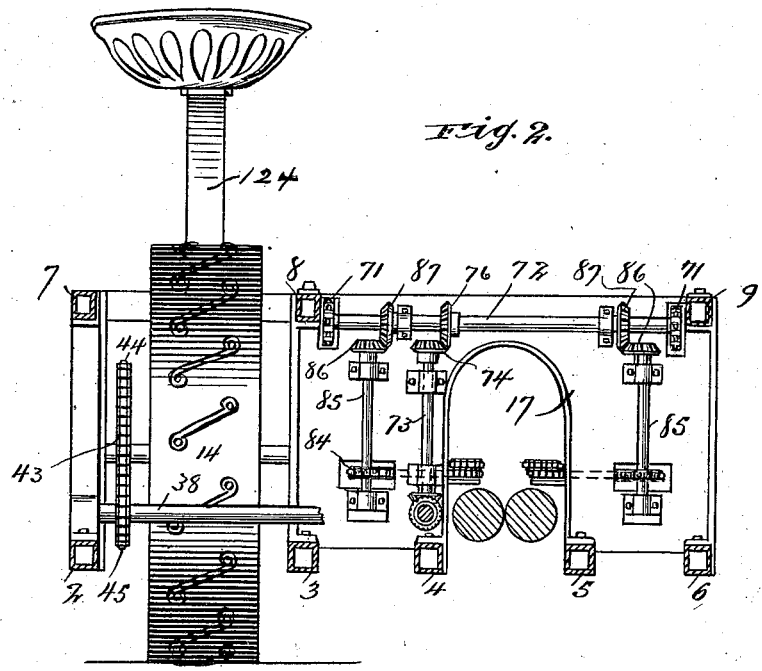
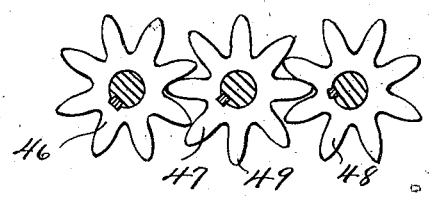

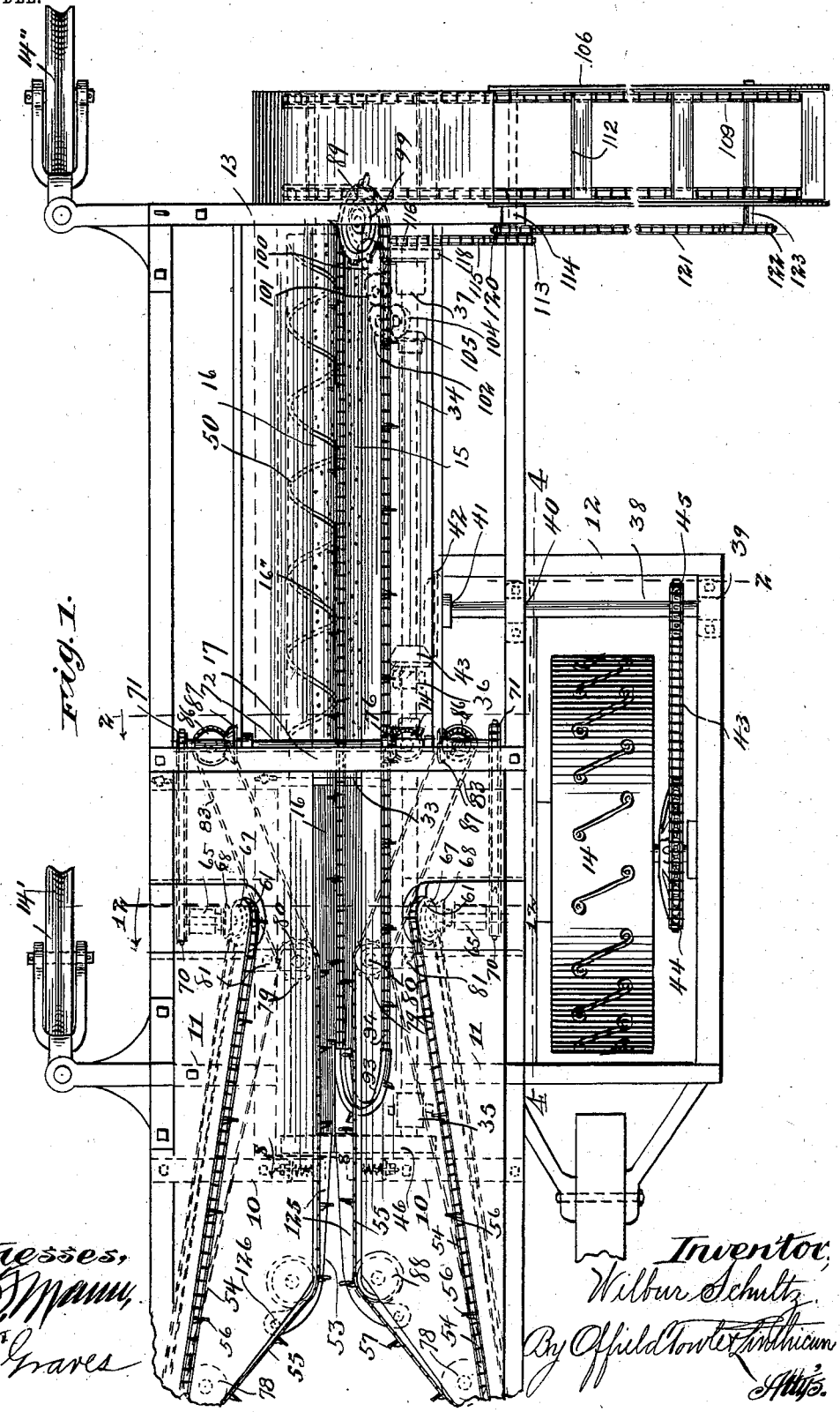

No. 727,851. PATENTED MAY 12, 1903.
W. SCHULTZ.
CORN HUSKING MACHINE.
APPLICATION FILED JULY 5, 1901.
NO MODEL.
5 SHEETS—SHEET 3.
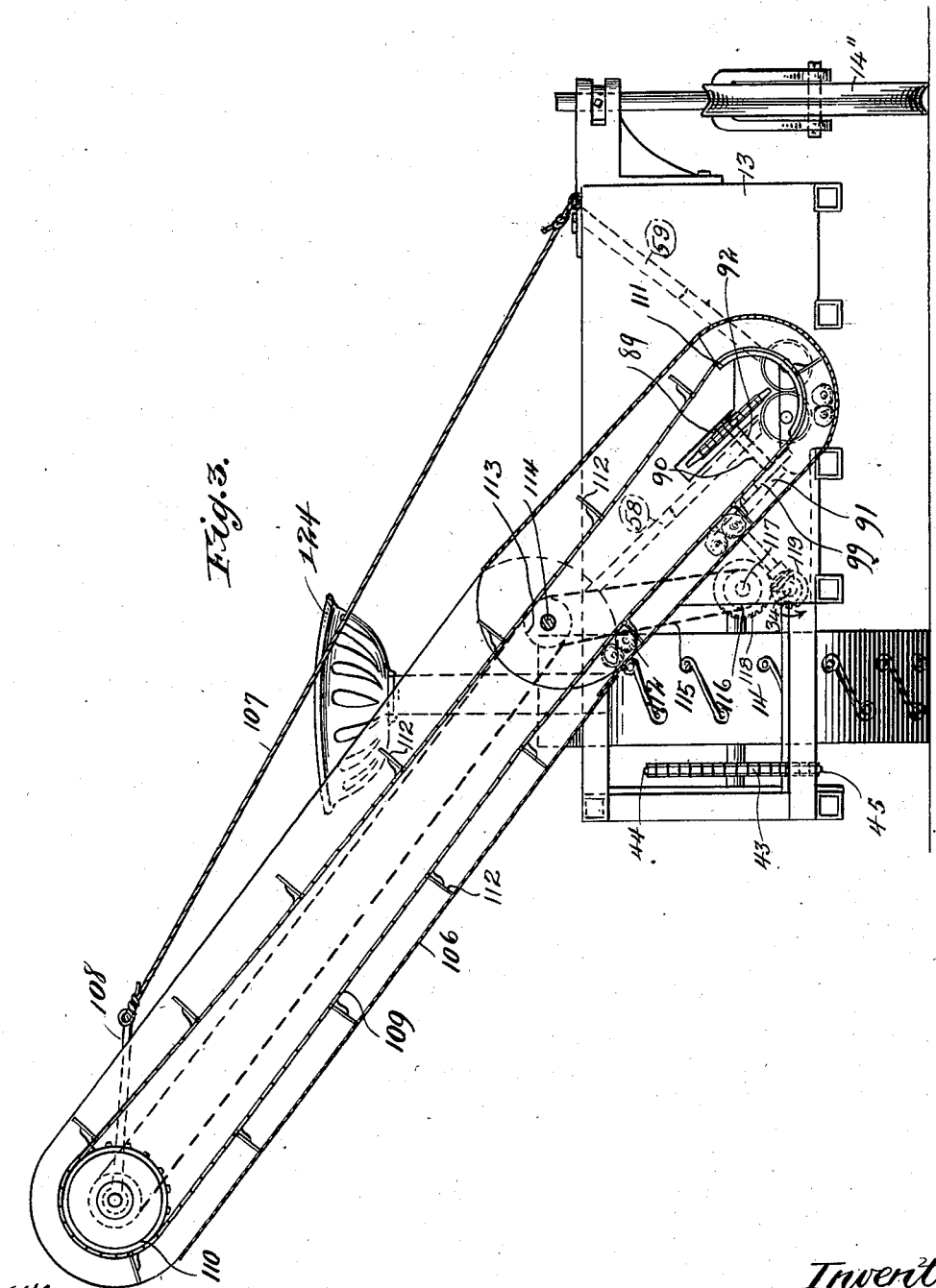

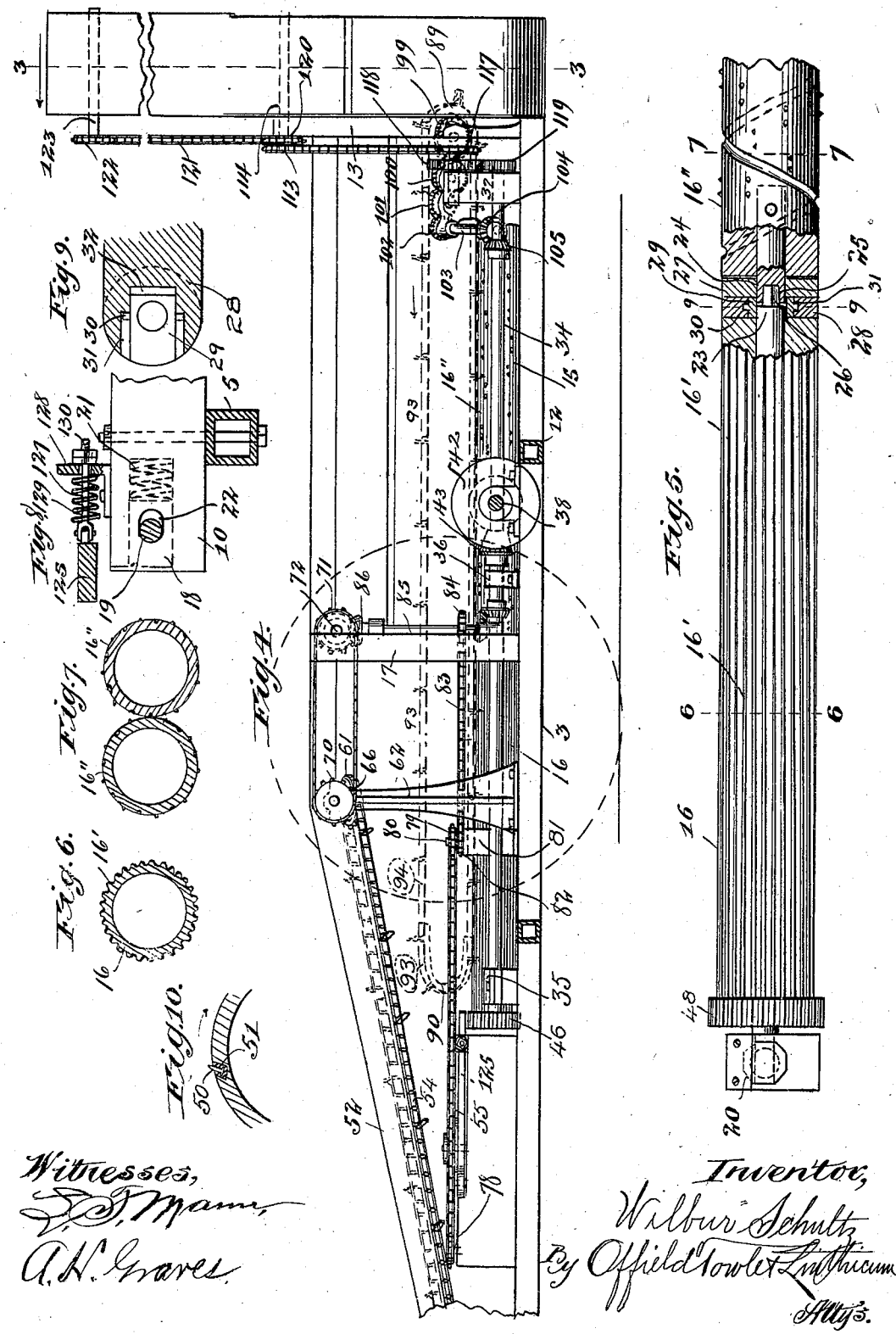

No. 727,851. PATENTED MAY 12, 1903.
W. SCHULTZ.
CORN HUSKING MACHINE.
APPLICATION FILED JULY 5, 1901.
NO MODEL. 5 SHEETS—SHEET 5.
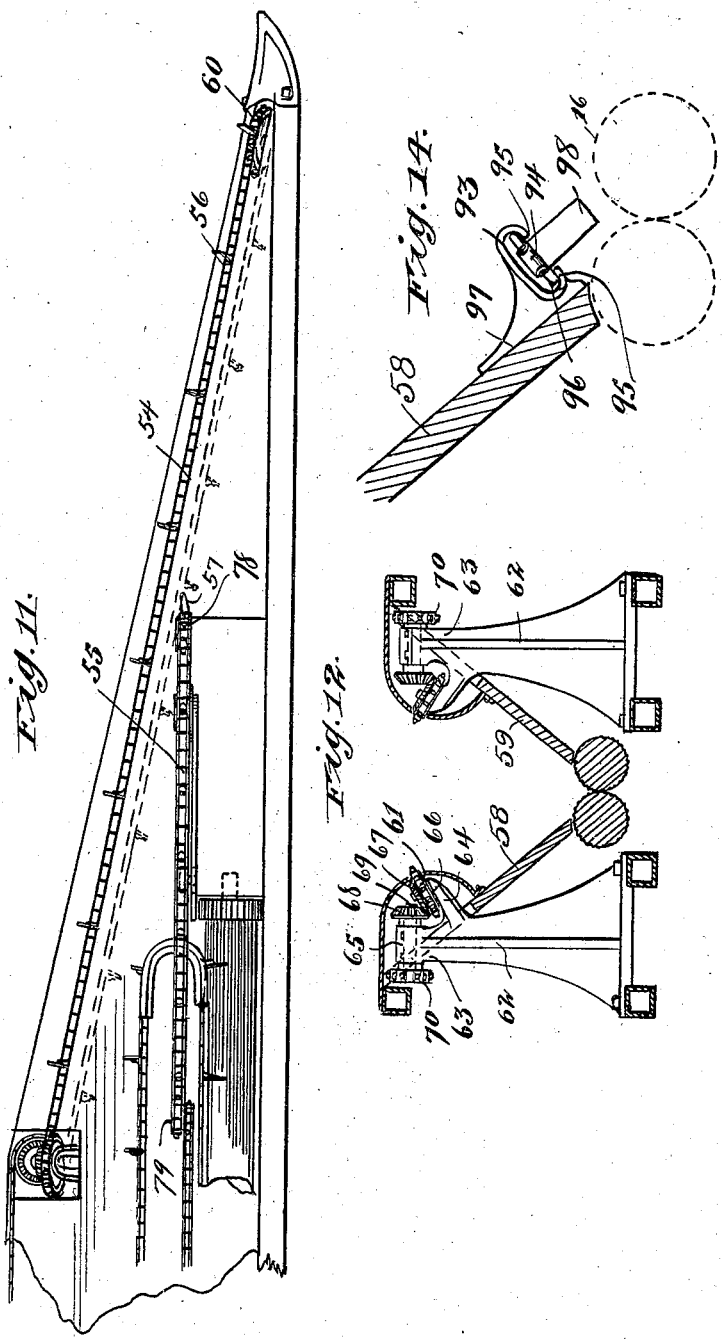
Witnesses,
Inventor,
Wilbur Schultz
By Offield Towle Linthicum
Attys.

No. 727,851. Patented May 12, 1903.

UNITED STATES PATENT OFFICE.

WILBUR SCHULTZ, OF WILMOT, SOUTH DAKOTA, ASSIGNOR OF ONE-HALF TO ANDY W. LINDQUIST, OF WILMOT, SOUTH DAKOTA.

CORN-HUSKING MACHINE.

SPECIFICATION forming part of Letters Patent No. 727,851, dated May 12, 1903.

Application filed July 5, 1901. Serial No. 67,119. (No model.)

*To all whom it may concern:*

Be it known that I, WILBUR SCHULTZ, of Wilmot, South Dakota, have invented certain new and useful Improvements in Corn-Husking Machines, of which the following is a specification.

This invention relates to improvements in corn-husking machines, and refers more specifically to a machine of that character which is drawn along a row of standing corn in the field and serves to not only gather or pick the corn from the stalks, but at the same time husks and delivers the husked corn or ears to a suitable conveyance traveling with the machine.

Among the salient objects of the invention are to provide a machine which will effectually pick and husk a row of corn as rapidly as the machine can be drawn along by a team; to provide a machine which operates upon the stalks of corn without cutting or severing the same, so that the stalks remain in the field, although crushed down by the passage of the machine; to provide a machine so constructed and arranged that such stalks as have been broken over or have fallen down will be effectually picked up and delivered to the picking and husking mechanism; to provide an extremely simple and effective picking and husking mechanism which operates to husk the ears, whether large or small, clean and without crushing or substantially bruising the corn; to provide means coöperating with the picking and husking mechanism for feeding the corn along gradually and positively, so as to prevent the possibility of clogging or interruption of the proper operation of the machine; to provide an improved feed mechanism for insuring the initial grasping of the stalks by the picking and husking rollers; to provide improvements in the details of construction whereby the machine is made capable of automatically adjusting itself to corn and cornstalks of varying sizes and for variations in the "stand" of corn or heaviness and thickness of growth of the latter; to provide a machine so constructed and arranged that it is substantially unaffected in its working when passing over unlevel ground—as, for instance, in going up or down hill; to provide a machine of extremely rigid and durable construction while at the same time made reasonably light, so that it may be handled by a single team, and in general to provide a machine of the character referred to of simple, effective, and durable construction.

To the above ends the invention consists in the matters hereinafter described, and more particularly pointed out in the appended claims, and the same will be readily understood from the following description, reference being had to the accompanying drawings, in which—

Figure 1 is a plan view of a machine embodying my invention, parts being broken away to reduce the size of the figure. Fig. 2 is a transverse vertical sectional view taken upon the indirect line 2 2 of Fig. 1 and looking toward the front of the machine. Fig. 3 is a transverse vertical sectional view taken on line 3 3 of Fig. 4 and looking toward the front of the machine. Fig. 4 is a longitudinal sectional view taken on line 4 4 of Fig. 1 and looking in the direction of the arrows. Fig. 5 is a fragmentary detail view showing the construction of both the husking-rollers, parts being shown in axial sectional view to expose the internal construction. Fig. 6 is a transverse sectional view of one of the husking-rollers, taken on line 6 6 of Fig. 5. Fig. 7 is a transverse sectional view of both rollers, taken on a line corresponding to the line 7 7 of Fig. 5. Fig. 8 is a transverse vertical sectional detail taken on line 8 8 of Fig. 1 and looking in the direction of the arrows. Fig. 9 is a transverse sectional view taken on line 9 9 of Fig. 5. Fig. 10 is a transverse sectional view, on an enlarged scale, taken through a spur-equipped portion of the roller—as, for example, on line 7 7 of Fig. 5. Fig. 11 is a fragmentary detail showing the inner side of one of the gathering-fingers and parts mounted thereon in side elevation. Fig. 12 is a transverse vertical sectional detail taken on line 12 12 of Fig. 1 and looking in the direction of the arrows. Fig. 13 is a transverse sectional view taken on line 8 8 of Fig. 1 and looking in a direction opposite that indicated by the arrows. Fig. 14 is a fragmentary transverse sectional view of the lower portion of one of the hopper members, showing particularly the mounting of the conveyer-support thereon.

Referring to said drawings, 1 designates as a whole the main frame of the machine, comprising a series of lower longitudinally-extending frame members 2, 3, 4, 5, and 6, parallel upper members 7, 8, and 9, and a series of cross-frame pieces 10, 11, 12, and 13, it being noted that none of the cross-frame pieces, with the exception of the member 13, extends entirely across the full width of the machine. The frame members referred to are so united as to provide a lateral rectangular frame, within which is located and journaled the main supporting or bull wheel 14, and to also provide a larger main rectangular frame, within which are journaled a pair of longitudinally-extending picking and husking rollers, (designated 15 and 16, respectively.) In order to rigidly unite the main frame at a point intermediate of its length, as well as to afford a suitable frame upon which to mount various operative parts, an arch-like frame member 17 is provided, suitably united at its lower side with the several frame members 3, 4, 5, and 6 and at its upper portions with the frame members 8 and 9, as best indicated in Fig. 2. The side of the main frame opposite that at which the master-wheel is located is supported by means of a pair of caster-wheels 14' and 14", mounted upon suitable brackets in a usual manner. The tongue and usual draft-rigging of the machine are conveniently connected with the front side of the rectangular frame, which incloses the master-wheel, as indicated clearly in the drawings.

The husking-rollers 15 and 16 are supported at three different points throughout their length—viz., at their forward ends, at a point midway of their lengths, and at their rear ends—by means of bearings constructed as follows: Referring to detail Figs. 5 and 8, within the proximate ends of the interrupted frame-timbers 10 are mounted longitudinally-sliding journal-boxes 18 adapted to receive the respective trunnions 19 of the husking-rollers, these boxes being arranged to work in ways so constructed as to confine the journal-boxes against lateral movement in any direction, said ways being preferably made hexagonal in cross-section, as indicated at 20, Fig. 5. Interposed between the inner end of each journal-box and the end of the way or socket within which it slides is a powerful coil-spring 21, which tends to hold the roller outwardly or in spring-pressed engagement with its fellow roller, and in order to provide for the lateral movement of the roller with the sliding journal-box that side of the frame member 10 through which the trunnion enters the journal-box is slotted, as indicated at 22. At their extreme opposite ends the rollers 15 and 16 are journaled in journal-boxes mounted upon the cross-frame member 13, these journal-boxes being of any suitable and ordinary construction which permits the rollers to rotate in bearing engagement with each other, and therefore require no detailed description.

Each of the rollers 15 and 16 consists of two main sections separable from each other at a point intermediate of the length of the roller and at which points of separation the rollers are supported by the intermediate bearing, hereinbefore referred to. Referring particularly to Figs. 1, 5, and 9, the two roller-sections 16' and 16" of the roller 16 are shown as each provided with a trunnion projection 23 and 24, respectively. One of the trunnions, 24, is provided with an axial non-circular socket 25, while the opposite trunnion is correspondingly reduced, as indicated at 26, and shaped to fit therein, thus providing a somewhat flexible driving connection between the two rollers, the flexibility of the union being secured by making the socket and interfitting projection slightly tapering and at the same time so constructed as not to fit too accurately together. The trunnion portion 24 of the rear end section of the husking-roller is supported in a transversely-arranged plate-like bearing member 27, which is suitably secured to the frame members of the main frame of the machine, the end portion thereof within which the roller is journaled being formed of the same diameter and concentric with the periphery of the roller, so as to form and effect a smooth continuation of the same. The trunnion portion 23 of the front end section of a husking-roller is likewise journaled in the supporting plate or bearing 28; but in order to provide for a limited oscillatory movement of the roller (to be hereinafter more fully described) said trunnion projection 23 is seated in a bearing-block 29, which is in turn movably seated in the bearing-plate 28. In the preferred construction shown the bearing-block 29 is provided at opposite sides with trunnion-like lugs 30, which fit within corresponding longitudinally-extending grooves 31, formed in the bearing-plate, these trunnions being arranged vertically to the longitudinal axis of the roller, so that the latter, together with the block, may oscillate in a horizontal direction or away from and toward its fellow roller. In order to provide for this rocking movement of the bearing-block, a slight space 32 is provided at its inner end, while its opposite end extends out flush with the end of the supporting-plate, which is made concentric with the roller in the same manner as plate 27. The roller 15 is likewise made in two sections united with each other in substantially the same manner as are the sections of the roller 16; but inasmuch as the roller 15 has no lateral movement in any of its parts it is unnecessary to provide for a flexible union of the two sections, and they are therefore simply united by a socket and projection constructed substantially like the corresponding parts of the roller 16, but mounted in a plain bearing-aperture in a single bearing-plate 33, substantially like the bearing-plate 27 with the exception that it is preferably of a thickness equal to the combined thickness of the bearing-plates 27 and 28.

As one of the important features of the invention I provide means whereby the rollers are driven, the one from the other and the latter from a drive-shaft, by means of intermeshing gears, the gears mounted upon the two rollers constituting not only the means of imparting motion thereto, but at the same time means for initially feeding the stalks between the rollers.

Referring more particularly to Figs. 1 and 13, 34 designates a main drive-shaft mounted in suitable bearings in the lower part of the main frame, as indicated at 35, 36, and 37, to extend longitudinally throughout practically the full length of the machine. 38 designates a transversely-arranged shaft mounted in suitable bearings 39, 40, and 41 at a point in rear of the bull-wheel and provided with a bevel-gear 42, which intermeshes with a corresponding bevel-gear 43, mounted upon said drive-shaft. The shaft 38 is driven from the bull-wheel through the medium of a sprocket-belt 43, trained around sprocket-wheels 44 and 45, mounted upon the bull-wheel and shaft, respectively, as indicated clearly in Fig. 1. Upon the forward end of the main drive-shaft 34 is mounted a spur-gear 46, (see detail Fig. 13,) which is arranged to intermesh with a somewhat similar spur-gear 47, mounted upon the trunnion of the roller 15, and the gear 47 in turn meshes with and imparts motion to a second similar gear 48, mounted upon the roller 16, and it is to be particularly noted that the gears 47 and 48 are provided with relatively long and narrow gear-teeth 49, the gear-teeth being severally of less width or thickness, measured circumferentially, than the intervals between the teeth and the axes of the two rollers being located at such distance apart that the points of the gear-teeth do not reach to the full depth of the spaces between the teeth. In other words, the gears are so formed and located relatively to each other that stalks of corn may pass bodily between the intermeshing teeth of the gears and between the rollers without either clogging the gears or injuring the mechanism. It may be explained, however, in this connection that in thus passing through the intermeshing gears the stalks will be crushed into flattened condition; but the space between the gears is such that the stalks will not be cut or torn to any substantial extent, but will remain connected with their butt ends rooted in the ground, so that as the machine is drawn along the stalks will be fed through downwardly between the rollers and be left in the field uncut. Owing to the yieldable mounting of the forward end of the roller 16 in the sliding bearing-block 18, hereinbefore particularly described, it will be obvious that the gears may separate to a limited extent when required to accommodate a plurality of stalks passing between the gears simultaneously or to accommodate unusually large and woody stalks. I consider this feature one of the important features of the invention, for the reason that the gears not only serve to initially crush the stalks into flattened form, so as to facilitate their starting downwardly through the rollers, but they also impart a more positive movement downwardly to the stalks than would be possible were the stalks simply passed between the rollers without being previously passed through the gears, and after they are once started there is practically no liability of their ceasing to feed regularly as the rollers revolve. It may be mentioned in this connection that the rate of rotation of the rollers and the gears which actuate the rollers is such that the stalks will be fed downwardly through the rollers more rapidly than the progress of the machine as it is drawn along would tend to draw or strip the stalks through the rollers by reason of the attachment of the stalks to their butts. A further advantage incidental to the feeding of the stalks through the gears initially is that each stalk is thus crushed and partially broken or crimped, so that after the machine passes the stalks are left crushed down and in good condition to be subsequently plowed under, thereby avoiding the necessity of a subsequent going over the field with a suitable machine for this particular purpose. In order to insure that the stalks will be brought into such alinement as to be directed certainly into the intermeshing teeth of the cogs 47 and 48, I provide a pair of spring-supported throat-plates 125, so mounted relatively to each other as to form a narrow throat in alinement with the meeting-line of the rollers. In the preferred construction shown each plate is pivoted, the forward ends of the throat-plates are arranged in divergent relation to each other and are pivotally attached to a suitable support at their said forward ends, as indicated at 126, while at their inner ends they are yieldably supported, so as to be capable of yielding away from each other by means of spring-plungers 127, (see detail Fig. 8,) pivotally connected therewith and working through suitable guides 128, the plungers being yieldably held against retraction by means of powerfully-coiled extension-springs 129, interposed between the guides 128 and the head ends of the plungers. The advance movement of the plungers under the action of the springs is limited by means of adjusting-nuts 130, threaded upon the rear ends of the plunger-stems. The guides 128 are mounted upon the frame member 10, hereinbefore described. As shown clearly in Figs. 1 and 8 of the drawings, the throat-plates are so located as to extend horizontally or in a plane parallel with the axes of the rollers from points some distance in advance of the front ends of the latter to points some distance in rear of the gears 47 48 and at such height as to just clear the upper peripheries of said gears. In order to insure a more positive feeding downward of the stalks between the rollers, the front end sections of both rollers are corrugated longitudinally, as indicated most clearly in Figs. 1 and 6, the corrugations preferably being deepest adjacent to their respective gears and gradually tapered out or made shallower toward the rear end of said sections. By reason of this construction it will be obvious that the butt-end and thicker portions of the stalks will be more positively grasped by the rollers and fed downwardly, this being especially necessary, owing to the fact that the stripping off of the ears will occur principally during the time the stalks are passing through the forward roller-sections.

Means are provided for conveying the ears stripped from the stalks rearwardly along the trough-like space formed by the rollers, as will hereinafter be fully explained, and in order to effect the stripping off of the husks from the ears the rear end sections of the rollers are differently constructed from the front end sections, as follows: Each rear end roller-section is provided with a series of short radially-projecting spurs 50, the most desirable specific form and arrangement of which is best shown in detail Fig. 10, these spurs being preferably arranged in pairs in longitudinal alinement with each other, so that any given portion of the husk engaged thereby will be simultaneously engaged at two points, and thus more positively turned and stripped from the ear. The series of pairs of spurs are arranged at intervals apart circumferentially and throughout practically the full lengths of the rear sections of the rollers, as indicated clearly in Fig. 1, the spurs of one roller being so located as to be interspaced relatively to the spurs of the opposite roller. Inasmuch as the rollers are so mounted as to rotate in direct bearing with each other so far as their outer surfaces are concerned, each roller is provided with cavities to accommodate the spur projections on the opposite roller, it being understood that inasmuch as the rollers are driven positively the one from the other by means of the gears described these cavities or recesses will always register with the spurs of the fellow roller. As a subordinate feature of improvement I mount the several spur projections in Babbitt metal or analogous metal, so that while held securely and rigidly in operative position they may nevertheless be taken out of the rollers for sharpening or renewal. In the preferred construction shown herein a cylindric cavity or recess 51 (see particularly detail Fig. 10) is provided in the surface of the roller for each spur, and the spurs are provided with headed ends, which are seated within said cylindric cavities, and the Babbitt metal then cast therein, thus securely holding the spur in the exact required position. The main body portions of the rollers are preferably made of metal of shell-like construction, as also indicated in said Fig. 10, so that when it is desired to remove the spurs the roller-section may be heated sufficiently to melt the babbitt, and thus release the spurs. Inasmuch as the husking of the ears of corn by the spur projections will occasionally shell off kernels of corn, I provide one of the rear roller-sections with a groove extending throughout its length of such size in cross-section as to accommodate such kernels and permit them to pass through between the rollers without forcing the latter apart or without being crushed. Preferably this groove is arranged to extend around the roller spirally, the oblique direction of the groove when thus arranged tending to facilitate the downward passage of the kernels while filling such passage throughout the entire length of the section of the roller.

To now describe the mechanism whereby the stalks are gathered and directed to the husking-rollers and the stripped-off ears subsequently fed along the rollers and through the machine, 52 52 designate as a whole a pair of gathering-fingers secured to the front end of the main frame to extend forwardly therefrom in divergent relation and so located relatively to each other as to direct the cornstalks into a throat 53, formed by and between said gathering-fingers, and thus between the husking-rollers. Preferably the gathering-fingers are made pointed and of increasing vertical width from their points rearwardly to their points of connection with the main frame, their inner faces or acting surfaces being inclined forwardly and outwardly away from each other as well as being arranged in divergent relation. Each finger is provided with two conveyer-belts 54 and 55, which assist in picking up the corn and carrying it very positively rearwardly between the fingers, said belts being of sprocket-chain construction and severally provided with series of projecting fingers or conveyer projections 56 and 57. From the rear end of each gathering-finger 52 a guard-board 58 and 59 extends throughout the length of the husking-rollers, these guard-boards being arranged at the same angle of divergence as the gathering-fingers and in continuation of the latter, so as to form a hopper-like receptacle above the husking-rollers, which are located at the apex of the hopper thus formed, as best indicated in Fig. 3.

The conveyer-belts 54 are arranged to each extend from a point somewhat in rear of the forward end of the husking-rollers and adjacent to the upper edge of the hopper obliquely, forwardly, and downwardly to a point as near the extreme point of the gathering-finger as practicable. To thus support and carry the belt, a suitable guide-sprocket 60 is mounted at the point of each gathering-finger and a corresponding driving-sprocket 61 located at the rear end of the gathering-finger, the axes of these two pairs of sprockets being arranged substantially parallel with the inner or directing face of the gathering-finger, so that the plane of the belt is located perpendicularly thereto and with one lap of the belt working inside of the gathering-finger and the other exteriorly thereof. In order to suitably support and actuate sprocket 61, a bearing-bracket 62 is mounted upon the longitudinal main-frame members at each side of and beneath the hopper members, which brackets are severally provided at their upper ends with divergent arms 63 64, upon which are mounted bearings 65 66. The sprocket 61 is mounted upon the arm 64 with its axis in the position hereinbefore described, and upon the outer or upper face of said sprocket is formed a gear 67, which intermeshes with the corresponding gear 68, mounted upon a transverse shaft 69, seated in the bearing 65, hereinbefore referred to. Upon the opposite end of the shaft 69 is mounted a sprocket 70, which is driven by a sprocket-belt, extending thence rearwardly to a sprocket 71, mounted upon a transversely-arranged shaft 72, which extends entirely across the machine and is suitably mounted in bearings upon the arch-frame 17, as clearly indicated in Fig. 2. The cross-shaft 72 is driven from the main longitudinal drive-shaft 34 by means of a shaft 73, provided at each end with bevel-gears 74 and 75, respectively, which intermesh with corresponding bevel-gears 76 and 77, mounted upon the shafts 72 and 34, respectively.

The conveyer-belts 55 severally extend from points intermediate of the length of the gathering-fingers rearwardly to points somewhat in rear of the front ends of the husking-rollers, these belts being desirably arranged to run substantially horizontal and at points intermediate of the vertical width of the gathering-fingers or so as to lie just above the upper surfaces of the gathering-rollers, as indicated clearly in the figures. In order to support and operate these conveyer-belts, guide-sprockets 78 (see Fig. 4) are mounted at suitable points upon the gathering-fingers, and corresponding drive-sprockets 79 are provided at points horizontally in rear thereof mounted upon vertical shafts 80, journaled in bearing-blocks 81, mounted upon the longitudinal frame-timbers 4 and 5, respectively, as best indicated in Figs. 1 and 4. Each shaft 80 is also provided with a sprocket 82, located immediately below the sprocket 79, which is driven by a sprocket-belt 83, extending thence rearwardly to and around a sprocket 84, mounted upon a vertical shaft 85. The two shafts 85, one at each side of the machine, are journaled in suitable bearings upon the main arch-frame in a manner substantially similar to the shaft 73 and are driven from the cross-shaft 72 by means of pairs of intermeshing gears 86 and 87. In addition to the guide-sprockets 78 and driving-sprocket 79, around which the conveyer-belts 55 are trained, an intervening guide-sprocket 88 is provided for each of said conveyer-belts so located as to cause the inner or acting lap of the belt to follow approximately the inner contour of the gathering-finger, as best shown in Fig. 1.

To next describe the conveyer-belt, which serves to draw the ears of corn stripped from the stalks along the husking-rollers, referring to Fig. 4, 89 designates a sprocket located adjacent to the rear ends of the husking-rollers and mounted upon a suitable stub-shaft 90, working in bearings 91 and 92, mounted upon the main frame and left-hand hopper side, respectively, as best indicated in Fig. 3, the axis of said shaft being arranged perpendicularly to said hopper side and the sprocket located somewhat above the latter in position for its lower periphery to project into the hollow or groove formed by the upper sides of the meeting rollers.

93 designates a track or way extending from a point near the sprocket-wheel 89 forwardly parallel with the husking-rollers to a point approximately even with the front ends thereof, at which point the end of the track is curved upwardly and outwardly parallel with the plane of the left-hand hopper member and parallel with the plane of the sprocket 89 and returned upon itself a short distance, so as to form a guide for the sprocket belt or conveyer 94, which is mounted to travel around the sprocket 89 and through the track 93. The track or way 93 is approximately C-shaped in cross-section, the inturned portions 95 forming supports which confine and carry flange-like projections 96, formed to extend laterally from the links of the conveyer-belt 94. Conveniently said track is supported rigidly in position by means of a series of brackets 97, mounted upon the proximate hopper member, as best indicated in detail Fig. 14. The conveyer-belt 94 is provided at frequent intervals with finger-like projections 98, which project downwardly into the hollow between the rollers and serve to carry along positively the ears stripped from the stalks of corn, finally discharging the latter at the rear end of the rollers into the boot of an elevator, to be hereinafter described.

In order to drive the sprocket 89, the lower end of the shaft 90 is provided with a spur-gear 99, which is arranged to intermesh with the proximate one of a train of gears, (respectively designated 100, 101, and 102,) the latter of which is mounted upon the end of a shaft 103, which extends downwardly in a direction parallel with the shaft 90 and is provided at its lower end with a bevel-gear 104, which intermeshes with a corresponding bevel-gear 105, mounted upon the main drive-shaft 34. The object of providing the train of gears described is twofold, primarily to reduce the speed of the sprocket-chain conveyer 94 and secondarily to so arrange the transmission members as to avoid the use of spiral gears and other complications.

Describing now the elevator hereinbefore referred to and referring more particularly to Fig. 3, where the elevator is shown in longitudinal section, 106 designates as a whole the elevator housing or chute, which is arranged to extend from the rear ends of the husking-rollers laterally obliquely forwardly and outwardly to a suitable height to convey the corn to a wagon, the upper end of the chute being conveniently supported by means of a cable 107, attached to a belt 108 at the upper end of the chute and extending thence obliquely downward to the opposite corner of the main frame, as clearly indicated in said Fig. 3. The conveyer 109, which works within the elevator-chute may be of any preferred or suitable construction, that shown herein comprising a pair of sprocket-chain belts respectively trained around sprockets 110, mounted upon a transverse shaft extending through the upper part of the chute and at their lower ends passing around semicircular guides 111, suitably mounted in the lower end or boot portion of the chute. Secured to and extending across said sprocket-chains at frequent intervals is a series of conveyer-blades 112, these blades being of such width as to extend from the lower lap of the conveyer downwardly to or adjacent to the bottom side of the chute, so as to engage and carry upwardly the ears of corn discharged into the lower end of the chute. The lower end of the chute is provided with a suitable inlet, through which the corn is admitted from the rollers, while at its upper end it is provided with a discharge-outlet, as usual. In order to actuate said conveyer, a sprocket 113 is mounted upon a shaft 114, arranged to extend transversely through the chute at a point approximately vertical above the main drive-shaft 34, which sprocket 113 is driven by means of a belt 115, extending thence downwardly to a corresponding sprocket 116, mounted upon a short shaft 117 and carrying a spur-gear 118, which is arranged to intermesh with the corresponding gear 119, mounted upon the said drive-shaft 34. Upon the shaft 114, adjacent to the sprocket 113, is mounted a second sprocket 120, over which is trained a belt 121, which extends thence upwardly to a sprocket 122, mounted upon the shaft 123, which carries the conveyer-sprockets at the upper end of the elevator-shaft. In order to accommodate the elevator-chute to wagons of different height, it is made of jointed construction, the upper end of the chute being capable of oscillatory movement relatively to the lower or boot section. To this end the shaft 114 is utilized as a pivot, with which the respective sides of the upper end section of the chute have pivotal engagement, the shaft being journaled in suitable bearings carried upon the sides of the lower section. Inasmuch as the sprockets 113 and 120 are mounted upon the said shaft 114, and are therefore concentric with the pivotal axis of the chute, the raising or lowering of the upper end of the latter does not affect the driving connections between the main shaft and the elevator-conveyer.

The operation of the machine constructed as described has been sufficiently indicated in connection with the description of the mechanism thereof to be entirely obvious, but may be briefly detailed as follows: The driver, seated upon the driver's seat 124, guides the team so that the gathering-fingers straddle the row to be husked. As the machine is drawn along such stalks as have been broken over or stand away from the main row are picked up by the point of the gathering-fingers and engaged by the long conveyer-belts and carried positively to the throat of the machine, while the upright stalks pass into the throat without guiding as the machine advances. The stalks as they enter the narrowest portion of the throat 53 are engaged by the fingers of the conveyer-belts and carried positively rearwardly, thereby bending the stalks rearwardly to some extent, owing to the fact that these conveyers run somewhat more rapidly than the rate of advancement of the machine and that the upper conveyers be driven more rapidly than the lower ones. As the stalks reach the intermeshing cogs of the rollers they are grasped by the latter and drawn downwardly simultaneously with their movement rearwardly between the rollers, the downward and rearward movement of the stalks continuing until they have been entirely fed through. As the stalks pass downwardly between the rollers the ears are pinched or stripped off, it being noted that they are almost invariably presented to the rollers butt first, so that usually the outer husks will remain attached to the stalks, passing out between the rollers with the stalks, while the partially-husked ears will be left resting upon the rollers. The partially-husked ears are conveyed gradually along the length of the rollers, the latter tending constantly to engage the loose husks and strip them from the ears as the latter are moved along. When the ears reach those portions of the rollers which are provided with the spurs, the latter dig into and engage the husks positively and carry them downward between the rollers, thus husking the corn clean before it reaches the rear end of the machine. The conveyer 94 serves to discharge the ears into the elevator, wherein they are transferred to the wagon in an obvious manner. It is to be particularly noted that the passage between the rollers is unobstructed from end to end of the machine, so that it is immaterial whether the stalks be completely passed through the rollers during their rearward passage between the front sections or not until they have reached the rear sections. The rate of speed of the rollers is such that in any event the stalks will be completely carried through the rollers before they reach the rear end of the machine.

It will be seen from the foregoing description that I attain the several objects of my invention and provide a machine which is at once rapid, effective in operation, and not likely to become clogged in operation and which will at the same time operate upon corn of widely-varying character without change or adjustment.

While I have herein shown and described what I deem to be a perfect embodiment of my invention, yet it will be obvious that the details of construction may be varied without departing from the spirit of the invention, and I do not, therefore, wish to be limited to the details of construction described except to the extent that they are made the subject of specific claims.

I claim as my invention—

1. In a corn-husking machine, the combination with a wheeled frame of a pair of husking and snapping rollers journaled to rotate alongside of each other, a pair of gears mounted concentric with and at the forward end of said rollers and arranged to intermesh with each other, the intermeshing peripheries of said gears being located in advance of the forward ends of the rollers, and in vertical alinement with the proximate sides of the rollers, and means for imparting rotation to the gears and rollers, for the purpose set forth.

2. In a corn-husking machine, the combination with a wheeled frame provided with a pair of gathering-guides arranged in divergent relations to each other to form a throat in rear of their advance ends, conveyer-belts mounted upon said gathering-guides to travel longitudinally thereon and provided with stalk-engaging projections or fingers, a pair of husking and snapping rollers located in rear of, and in alinement with, the throat formed between said gathering-guides, a gear mounted upon the forward end of each of said rollers, of a pitch diameter substantially equal to that of the roller and arranged to intermesh with each other, means for imparting a positive rotation to said gears as the machine is drawn along, projections upon said rollers adapted to engage and strip the husks from the ears of corn lying thereon, and means for conveying the ears of corn rearwardly along said rollers, for the purpose described.

3. In a corn-picking machine, the combination with the wheeled main frame, and a pair of divergent gathering-fingers, of a pair of throat-plates pivotally mounted upon said gathering-fingers and arranged to extend within the throat formed within said fingers, springs holding said throat-plates yieldably against receding from each other, a pair of husking and snapping rollers journaled alongside of, and in bearing with, each other in position to receive stalks from the throat between said throat-plates between their meeting sides, spur-gears mounted upon the forward ends of the respective rollers concentric with the several axes thereof opposite the yieldable portions of said throat-plates and arranged to loosely intermesh with each other across the throat-opening between the throat-plates, a series of projections upon the husking portion of one or both of said rollers adapted to engage and strip the husks from the ears of corn, as the rollers are rotated, means for imparting a positive rotation to the rollers as the machine is advanced and means for conveying the ears of corn longitudinally along the rollers, for the purpose set forth.

4. In a corn-husking machine, the combination of a pair of husking and snapping rollers journaled to rotate alongside of each other and horizontally disposed, each roller being of transversely-divided construction and having a forward section constructed to move yieldingly away from its opposing roller, and which yielding section is longitudinally corrugated, and a rear section fixed against substantially lateral movement and provided with spur projections, and a pair of spur-gears mounted at the forward ends of said rollers and rotating with the latter, said spur-gears being provided with relatively long and loosely-intermeshing teeth arranged to overlap the throat-opening at the entrance between said rollers, as and for the purpose set forth.

5. In a corn-husking machine, the combination of a pair of husking-rollers journaled to rotate alongside of and in bearing with each other, one of said rollers comprising two or more transversely-separated sections, and means flexibly uniting said sections in a manner to enable one section to be positively driven from the other, comprising a bearing-plate arranged to extend between the contiguous ends of said roller-sections, a bearing-block mounted to slide in ways extending transversely to the length of the roller and provided with a bearing-aperture and trunnion-like projections upon the roller-sections coupled together and engaging the bearing-aperture of said bearing-block, substantially as described.

6. In a corn-husking machine, a husking-roller comprising two sections flexibly united with each other by means imparting a positive rotation from one to the other, as and for the purpose set forth.

7. In a corn-husking machine, the combination of a wheeled main frame comprising laterally opposite main-frame sections unconnected with each other from the front end of the machine rearwardly to the rear end cross-frames except by overhead cross-frame members whereby to provide a longitudinally-extending unobstructed passage between said laterally opposite frame-sections, gathering-guides arranged at the front of said frame-sections to direct the stalks of corn into said passage between the frame-sections, a pair of husking and snapping rollers journaled in the respective laterally opposite frame-sections to rotate alongside of and in contact with each other, and yieldingly mounted so as to separate laterally away from each other, their meeting surfaces being located in said longitudinally-extending passage, a pair of spur-gears mounted upon the forward ends of said husking and snapping rollers and arranged to intermesh with each other loosely, the teeth of said spur-gears being arranged to intermesh to an extent greater than the extent of lateral movement of said rollers away from each other, whereby one roller is positively driven from the other at all times, a drive-shaft arranged to extend parallel with said husking and snapping rollers and provided with a gear intermeshing with the spur-gear of the proximate husking and snapping roller, a master-wheel journaled in the main frame and driving connections between said master-wheel and said longitudinally-extending drive-shaft, substantially as described.

8. In a corn-husking machine, the combination with a pair of husking-rollers, of a pair of spur toothed gears mounted with their axes concentric with the longitudinal axes of the husking-rollers and at the forward ends thereof, said gears being arranged to intermesh but being set sufficiently apart to prevent the teeth intermeshing their full depths, and means for positively rotating said gears and rollers in the same direction.

9. In a corn-husking machine, the combination of a main frame comprising two laterally parallel frame structures united at a point intermediate their lengths and a substantial distance in rear of the front ends thereof by an overhead transverse arch and at their rear ends by cross-frame members, a master-wheel journaled in said main frame at one side, one or more supporting-wheels at the opposite side of said main frame, a pair of gathering-fingers mounted at the front end of the machine in divergent relation, a pair of husking and snapping rollers journaled to extend alongside of and in bearing with each other in rear of and in alinement with the throat between said gathering-fingers, said rollers being each transversely divided intermediate its length and flexibly united whereby the forward sections are free to yield laterally, a pair of intermeshing gears mounted upon the forward ends of said husking and snapping rollers with their axes coincident with the respective axes of the rollers, a main drive-shaft arranged to extend parallel with and adjacent to one of said husking and snapping rollers throughout the main length of the machine and provided at its forward end with a gear intermeshing with that of the adjacent husking and snapping roller, driving connections between said master-wheel and said main shaft, conveyer-belts mounted on the respective gathering-fingers to extend longitudinally of the latter, a conveyer-belt mounted to travel longitudinally above and in proximity to the upper sides of said husking and snapping rollers, and driving connections between said main shaft and said several conveyer-belts, the driving connections between said husking-rollers and the conveyer-belts of the gathering-fingers being such as to impart a speed sufficient to draw practically the entire lengths of the stocks downwardly through the rolls before they reach a position opposite the point of flexible union between the roller-sections, substantially as described.

10. In a corn-husking machine, the combination of a main frame comprising two laterally opposite main-frame structures united at a point intermediate their lengths by means of a transverse arch, a pair of husking-rollers arranged to extend longitudinally of the machine and beneath the central part of said arch, conveyer-belts arranged to travel adjacent to the upper sides of said rollers and other conveyer-belts arranged to travel at an elevation above said first-mentioned conveyer-belts, and means for imparting a synchronous driving movement to said rollers and said conveyer-belts comprising a main shaft journaled to extend longitudinally of the main frame and through the lower part of said transverse arch, a transverse shaft mounted upon the upper part of said arch to extend horizontally across the machine, driving connections between said main shaft and said horizontal transverse shaft, driving connections between the upper conveyer-belts and said horizontal transverse shaft, driving connections between said main shaft and the husking-rollers and driving connections between the lower conveyer-belts and main shaft, substantially as described.

WILBUR SCHULTZ.

Witnesses:
A. W. LINDQUIST,
ALBERT H. GRAVES.